UNITED STATES PATENT OFFICE.

NATHAN ROSENTHAL AND ABRAHAM ROSENTHAL, OF BALTIMORE, MD.

IMPROVEMENT IN VETERINARY MEDICINES.

Specification forming part of Letters Patent No. 216,348, dated June 10, 1879; application filed March 13, 1879.

*To all whom it may concern:*

Be it known that we, NATHAN ROSENTHAL and ABRAHAM ROSENTHAL, of the city of Baltimore and State of Maryland, have invented a new and useful Composition for Cattle-Powders, of which the following is a specification.

Our invention has for its object to provide an improved composition for cattle-powders, consisting of the hereinafter-named medicinal ingredients, to wit: Fenugreek-seeds, saltpeter, muriate of ammonia, gentian-root, chloride of sodium, black antimony, sulphur, each one pound; wild-cherry bark, four ounces; flaxseed, four pounds; and domestic-pigeon manure, two ounces. This latter is obtained in the fresh state, and is dried by any suitable means and pulverized, to adapt it for admixture with the other ingredients, all of which should be likewise in a powdered state.

One table-spoonful of the mixture is an average dose, and should be given to the animal at suitable intervals until six doses have been administered.

We regard this mixture as a superior remedy in the treatment of pleuro-pneumonia in cattle.

While the proportions here given of the several ingredients are deemed to be the best, we do not limit ourselves to the precise quantity specified for each.

We are aware that the ingredients of this composition have before been used separately in condition-powders, and also that the majority of them are given in Recipe 2, Condition-powders, on page 74 of Beasley's Druggists' Receipt Book; but we claim ours to possess superior medicinal properties.

Having described our invention, we claim and desire to secure by United States Letters Patent—

The herein-described medicinal composition for cattle, consisting of fenugreek-seeds, saltpeter, muriate of ammonia, gentian-root, chloride of sodium, black antimony, sulphur, wild-cherry bark, flaxseed, and domestic-pigeon manure, the whole combined and mixed together in about the proportions set forth.

NATHAN ROSENTHAL.
ABRAHAM ROSENTHAL.

Witnesses:
CHARLES E. LEWIS,
CHAS. B. MANN.